2,897,162

WATER-SOLUBLE ORGANIC NITROGEN COMPOUNDS

Arthur Lowe, James Albert Moyse, and Alan Metcalf Wooler, Blackley, Manchester, England, assignors to Imperial Chemical Industries Limited, a corporation of Great Britain No Drawing. Application August 5, 1954
Serial No. 448,126

Claims priority, application Great Britain August 14, 1953

15 Claims. (Cl. 260—2)

This invention relates to water-soluble organic nitrogen compounds and to their use for the treatment of textile materials in conjunction with the dyeing thereof.

It has already been proposed, for example, in specification No. 522,539, now Patent No. 2,818,525, to enhance the fastness to water of dyeings on various yarns and fabrics by treatment with a solution of a product obtained by the reaction of dicyandiamide with a polyalkylenepolyamine.

We have now found that greater fastness to wet treatments can be attained by the use of new products derived from N-substituted dicyandiamides.

Thus according to the present invention we provide water-soluble organic nitrogen compounds obtainable by heating together in the absence of water an N-substituted dicyandiamide of the formula

ANX—C(NH)—NHCN wherein A stands for an alkyl, alkylene, aralykyl, aryl or arylene radical, which may bear one or more simple neutral or basic substituents, and X stands for hydrogen or an alkyl radical, and a linear polyalkyleneimine of the formula

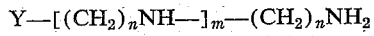

Y—[(CH$_2$)$_n$NH—]$_m$—(CH$_2$)$_n$NH$_2$ wherein Y stands for —NH$_2$ or OH or a halogen, $n$ is 2, 3, 4, 5 or 6 and $m$ is a whole number greater than zero.

Suitable N-substituted dicyandiamides for use as starting materials in the process of this invention include, for example, ethylene-bis-dicyandiamide, p-chlorophenyldicyandiamide, hexamethylene-bis-dicyandiamide and phenyldicyandiamide. Processes for the manufacture of these N-substituted dicyandiamides are described, for example, in specifications Nos. 576,401, 599,713 and 599,722.

Suitable polyalkyleneimines for use as starting materials include, for example, diethylenetriamine, triethylenetetramine, tetraethylenepentamine, bis-hexamethylene triamine, 1:2-bis-(omega-aminohexylamino)-ethane or polyethyleneimines prepared by initiating the polymerisation of ethyleneimine with hydrochloric acid.

In place of the polyalkyleneimine there may be used derivatives thereof reacting in the same way, for example, the carbonates.

The heating together of the N-substituted dicyandiamide salt and the polyalkyleneimine, or mixtures thereof, is effected at elevated temperatures of from 70° C. to 200° C. The heating is preferably continued until the evolution of ammonia has practically ceased. This usually takes 1–20 hours.

If desired, solvents may be used, for example hydroxylic solvents, such as butanol, β-ethoxyethanol or β-butoxyethanol.

The new water-soluble organic nitrogen compounds of this invention are strongly basic viscous liquids. They are useful for the treatment of cellulosic and polyamide textile materials or fibres in order to improve their dyeability. After treatment with the products of this invention, applied for example from aqueous solution at a temperature of from 50° to 100° C., cellulosic textiles can be dyed with acid and chrome dyestuffs; polyamide materials so treated are found to take up from the dyebath several times as much of those dyestuffs that are solubilised by means of anionic groups as compared with untreated materials.

The treatment may also be carried out on undrawn polyamide fibres by application of the products from aqueous solution, either alone or in conjunction with other agents used in the normal production of the undrawn fibres, for example, in the spin finish. The so-treated fibres may subsequently be drawn by the usual means with an ease similar to that of the untreated fibres and yield drawn fibres possessing improved affinity for dyestuffs solubilised by means of anionic groups. Polyamide materials treated with the products of the invention have greater resistance to degradation by light than have the untreated materials.

The products of the invention or their salts can also be used for aftertreating direct cotton dyeings, if desired in conjunction with metal salts such as copper salts, in order to enhance the fastness of the dyeings. In this aftertreatment, the products may be applied for example from aqueous solution at a temperature of 50°–100° C. by the customary padding process. The products are especially valuable in these connections for the treatment of cellulosic and polyamide fibres in admixture with other fibres such as wool.

When the organic nitrogen compounds are used in conjunction with metal salts it is normally necessary to prepare a fixing bath by dissolving the nitrogen compound in water, adding a calculated amount of the metal salt, which differs for each nitrogen compound, and then a mild alkali.

This process can be simplified by the use of the compounds which are obtained by reacting the said nitrogen compounds with the metal salts.

Thus according to a further feature of the present invention we provide water-soluble metal-containing organic nitrogen compounds obtainable by reacting together in aqueous solution a water-soluble metal salt and an organic nitrogen compound as hereinbefore defined, or a salt thereof, and thereafter isolating the product.

Especially valuable metal salts for use in preparing the metal-containing nitrogen compounds are the copper salts such as the chloride, sulphate, formate or acetate. Other metal salts may also be used, for example chromium acetate, chromium chloride, nickel nitrate, cobalt nitrate.

Salts of the organic nitrogen compounds that can be used include the hydrochloride, sulphate or acetate.

The reaction of the metal salt and the nitrogen compound occurs on mixing aqueous solutions thereof and may be accelerated by heating. The product may readily be isolated by evaporation and is found to contain the metal in a non-cationic form, as shown by the fact that the usual inorganic reagents such as hydrogen sulphide or ammonium sulphide do not form precipitates of the corresponding sulphides.

The metal-containing organic nitrogen compounds of the present invention can be used for treating textiles in conjunction with the dyeing thereof in the manner described above for the simple organic nitrogen compounds. The treatment process is simplified, as compared with the application of the simple organic nitrogen compounds in conjunction with metal salts since the treatment bath is readily prepared by dissolving the metal-containing organic nitrogen compound in water, optionally in the presence of a mild alkali such as sodium bicarbonate, sodium carbonate or ammonia. Dyestuffs containing metallisable groups are especially suitable for fixation by means of the metal-containing organic nitrogen compounds.

The invention is illustrated but not limited by the following examples in which parts are by weight.

*Example 1*

44 parts of ethylene-bis-dicyandiamide (prepared by reaction of 1 mole of ethylene diamine dihydrochloride with 2 moles of the sodium salt of cyanocyanamide) are added, while stirring, to 43 parts of tetraethylenepentamine. The mixture is heated to 110–120° C. when evolution of ammonia commences, accompanied by frothing. The temperature is carefully raised to 150°–160° C. after the initial vigorous reaction has subsided, and is maintained at this level for 8–12 hours. As condensation proceeds the reaction mixture becomes more viscous and increasingly more difficult to stir. The product is dissolved in water and the resulting aqueous solution may be used for the pre-treatment of polyamide textile materials to improve the dye uptake from the dyebath of those dyestuffs that are solubilised by means of anionic groups or for the after-treatment of cellulosic fabrics dyed with substantive dyestuffs, either as such or in the form of neutral salts, alone or in admixture with metallic salts, to improve their wet-fastness properties.

*Example 2*

39 parts of p-chlorophenyldicyandiamide (prepared as described in specification No. 599,722 from p-chloroaniline hydrochloride and the sodium salt of cyanocyanamide) and 38 parts of tetraethylenepentamine are mixed and heated with stirring to 110°–120° C. After 15 minutes the p-chlorophenyldicyandiamide dissolves, accompanied by some frothing and the commencement of the evolution of ammonia. After heating for 45 minutes the contents of the reaction vessel are discharged and allowed to cool. The resulting viscous, syrupy mass is soluble in hot water, and the solution may be used as described in Example 1.

*Example 3*

25 parts of hexamethylene-bis-dicyandiamide are stirred into 18.9 parts of tetraethylenepentamine and the mixture is heated. At 120–130° C. the mass begins to evolve ammonia, indicating the commencement of condensation. The temperature is increased to 140°–150° C. and is maintained at this level for 5 hours. The viscous reaction mixture is allowed to cool to 90°–100° C. and is cautiously diluted with 60–70 parts of water. The solution so obtained can be further diluted with hot water and used as such for the dyeing treatments described in Example 1.

*Example 4*

45 parts of phenyldicyandiamide are stirred into 53 parts of tetraethylenepentamine and the mixture is heated. A considerable evolution of ammonia commences as the temperature is increased to 120–130° C. The temperature is held at this level for 1½ hours and the resulting viscous base is then discharged from the reaction vessel. It is soluble in hot water and the solution can be used as described in Example 1.

*Example 5*

A mixture of 33 parts of cyclohexyldicyandiamide and 40 parts of tetraethylenepentamine is heated, with stirring, to 150–170° C. A vigorous evolution of ammonia commences at this temperature, which is then maintained for 6–7 hours. The resulting viscous condensation product is soluble in hot water and the solution is suitable for use in the dyeing treatments outlined above.

*Example 6*

43 parts of polyethyleneimine of molecular weight of the order of 900, 9.5 parts of ethylene-bis-dicyandiamide and 30 parts of β-ethoxyethanol are stirred together under reflux at a temperature of 135–150° C. for 22–24 hours. A slow but steady evolution of ammonia takes place. The solvent is then removed from the condensation mixture, preferably by distillation under reduced pressure, and the residual condensate is dissolved in hot water. It may be used in the form of its aqueous solution for the dyeing treatments described in Example 1.

*Example 7*

A mixture of 37 parts of ethylene-bis-dicyandiamide, 20 parts of diethylenetriamine and 40 parts of β-ethoxyethanol is stirred under reflux while being heated at 135–145° C. A copious evolution of ammonia takes place, accompanied by the dissolution of the ethylene-bis-dicyandiamide and the formation of a homogeneous, viscous reaction mixture. After 6–7 hours the β-ethoxyethanol is removed, preferably by distillation under reduced pressure, and the condensate is dissolved in hot water. This solution may be used as described in Example 1.

*Example 8*

A mixture of 60 parts of polyethylene-polyamine, having a boiling point at 14 mm. of more than 210° C. and 32 parts of phenyldicyandiamide is heated, while stirring, to 150°–160° C. Condensation occurs with evolution of ammonia. After heating for 2 hours at 150–160° C. the resulting viscous base is discharged from the reaction vessel. It is soluble in hot water to give a solution suitable for use as previously outlined.

*Example 9*

14 parts of copper sulphate crystals are dissolved in 100 parts of water and the solution is added at 25–30° C. to 75 parts of a 40% aqueous solution of the condensation product of ethylene bis-dicyandiamide and tetraethylene pentamine (prepared by heating a mixture of equimolecular proportions of ethylene-bis-dicyandiamide and tetraethylene pentamine to 110–120° C. when evolution of ammonia commences, raising the temperature carefully to 150–160° C. and maintaining it at this level for 8–12 hours). The solution is then evaporated to dryness, a bluish green powder being obtained which when used even in small quantities greatly improves the fastness properties of substantive dyeings. Solutions of the product in dilute hydrochloric acid give no precipitate with hydrogen sulphide.

*Example 10*

8 parts of copper acetate crystals are dissolved in 50 parts of water and the solution is added to 75 parts of a 40% aqueous solution of the condensation product of ethylene-bis-dicyandiamide and tetraethylene pentamine (prepared as described in Example 9) at 50–60° C. and the whole is evaporated to dryness. A green powder is obtained which is readily soluble in water and which possesses a high power of increasing the fastness properties of substantive dyeings.

*Example 11*

10 parts of copper chloride crystals are dissolved in 50 parts of water and the solution is added to 85 parts of a 40% aqueous solution of the ethylene-bis-dicyandiamide and tetraethylene pentamine (prepared as described in Example 9) and the whole is evaporated to dryness. A green powder is obtained which is readily soluble in water and whose solutions, preferably aqueous, may be used to increase the capacity of polyamide fibres to take up dyestuffs solubilised by means of anionic groups.

*Example 12*

2 parts of copper sulphate crystals are dissolved in 70 parts of water and the solution is added at 70–80° C. to 150 parts of a 20% aqueous solution of the condensation product of ethylene-bis-dicyandiamide and diethylene triamine (prepared by heating equimolecular proportions of ethylene-bis-dicyandiamide and diethylene triamine in β-ethoxyethanol solution for 8 hours at 135–145° C. followed by removal of the solvent by evaporating under reduced pressure). The solution is then evaporated to dryness, whereby a bluish green solid is obtained which can be used to improve the fastness of substantive dyeings.

*Example 13*

3 parts of copper chloride crystals are dissolved in 70 parts of water at 50° C. and the solution is added at this temperature to 90 parts of a 33% aqueous solution of the hydrochloride of the condensate of ethylene-bis-dicyandiamide and diethylene triamine (prepared by heating a mixture of equimolecular proportions of ethylene-bis-dicyandiamide and diethylene triamine in β-ethoxyethanol solution for 13 hours at 135–145° C., diluting with an equal volume of water, neutralising to pH 8 by means of hydrochloric acid followed by evaporating to dryness under reduced pressure at 70–90° C.). The solution is evaporated to dryness whereby a green solid is obtained which when used even in small quantities greatly improves the fastness properties of substantive cotton and viscose dyestuffs.

If in place of the 3 parts of copper chloride crystals there are used 4 parts of copper sulphate or 2.5 parts of copper acetate crystals, green water-soluble substances are obtained which are also capable of improving the fastness properties of substantive dyeings.

Aqueous solutions of these substances or their salts give no precipitates when treated with hydrogen sulphide or ammonium sulphide.

*Example 14*

3 parts of copper chloride crystals are dissolved in 30 parts of water at 50° C. and the solution is added at this temperature to 90 parts of 33% aqueous solution of the acetate of the condensate of ethylene-bis-dicyandiamide and diethylene triamine (prepared by heating a mixture of equimolecular proportions of ethylene-bis-dicyandiamide and diethylene triamine in β-ethoxyethanol solution for 13 hours at 135–145° C., diluting with an equal volume of water, neutralising to pH 7 by means of acetic acid followed by evaporating to dryness under reduced pressure at 70°–90° C.). Evaporation of the resulting green aqueous solution to dryness yields a green solid which possesses the property of improving greatly the fastness properties of substantive dyeings.

*Example 15*

If in Example 9 there are used 8 parts of copper sulphate and 75 parts of a 40% aqueous solution of the condensation product of ethylene-bis-dicyandiamide and triethylene tetramine (prepared under the same conditions as those described for the tetraethylenepentamine condensate described in Example 9) a bluish green solid is obtained which possesses the property of improving the fastness properties of substantive dyeings.

*Example 16*

6 parts of chromium sulphate crystals are dissolved in 60 parts of water at 75° C. and the solution is added at this temperature to 100 parts of a 30% aqueous solution of the acetate of the condensate of ethylene-bis-dicyandiamide and diethylene triamine (prepared by heating a mixture of equimolecular proportions of ethylene-bis-dicyandiamide and diethylene triamine in β-ethoxyethanol for 13 hours at 135–145° C., adding an equimolecular proportion of acetic acid followed by evaporating to dryness under reduced pressure at 60° C.). The solution is evaporated to dryness under reduced pressure at 30–40° C. whereby a light green solid is obtained.

What we claim is:

1. Water-soluble organic nitrogen compounds obtained by heating together in the absence of water and at a temperature between 70° and 200° C., with evolution of ammonia, (1) an N-substituted dicyandiamide selected from the group consisting of dicyandiamides of the formula

ANX—C(NH)—NHCN and

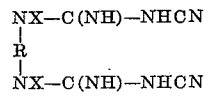

NX—C(NH)—NHCN
|
R
|
NX—C(NH)—NHCN wherein A stands for an aryl radical, R stands for an alkylene radical and X stands for a member of the group consisting of hydrogen and an alkyl radical, and (2) a linear polyalkyleneimine of the formula

Y—[(CH₂)ₙ—NH—]ₘ—(CH₂)ₙNH₂ wherein Y stands for a member of the group consisting of —NH₂, OH and halogen, $n$ is a whole number from 2 to 6 and $m$ is a whole number greater than zero.

2. Water-soluble organic nitrogen compounds as claimed in claim 1 wherein the radical A bears a chlorine substituent.

3. Water-soluble organic nitrogen compounds as claimed in claim 1 in the form of a salt selected from the group consisting of the hydrochloride, sulphate and acetate.

4. A water-soluble organic nitrogen compound obtained by heating together in the absence of water ethylene-bis-dicyandiamide and tetraethylenepentamine.

5. A water-soluble organic nitrogen compound obtained by heating together in the absence of water ethylene-bis-dicyandiamide and diethylene triamine.

6. A water-soluble organic nitrogen compound obtained by heating together in the absence of water ethylene-bis-dicyandiamide and triethylene tetramine.

7. A water-soluble organic nitrogen compound obtained by heating together in the absence of water p-chlorophenyldicyandiamide and tetraethylenepentamine.

8. A water-soluble organic nitrogen compound obtained by heating together in the absence of water hexamethylene-bis-dicyandiamide and tetraethylene-pentamine.

9. A water-soluble metal-containing organic nitrogen compound obtained by reacting together in aqueous solution a water-soluble copper salt and the nitrogen compound of claim 4.

10. A water-soluble metal-containing organic nitrogen compound obtained by reacting together in aqueous solution a water-soluble copper salt and the nitrogen compound of claim 5.

11. A water-soluble metal-containing organic nitrogen compound obtained by reacting together in aqueous solution a water-soluble copper salt and the nitrogen compound of claim 6.

12. Water-soluble metal-containing organic nitrogen compounds obtained by reacting together in aqueous solution a water-soluble metal salt and a member of the group consisting of an organic nitrogen compound as claimed in claim 1 and a salt thereof and thereafter isolating the product.

13. Water-soluble metal-containing organic nitrogen compounds as claimed in claim 12 wherein the metal salt is a copper salt.

14. Water-soluble metal-containing organic nitrogen compounds as claimed in claim 12 wherein said water-soluble metal salt is a chromium salt.

15. Water-soluble metal-containing organic nitrogen compounds as claimed in claim 13 wherein said copper salt is selected from the group consisting of copper chloride, copper sulphate and copper acetate.

References Cited in the file of this patent

UNITED STATES PATENTS

| | | |
|---|---|---|
| 2,364,725 | Landolt | Dec. 12, 1944 |
| 2,455,896 | Nagy | Dec. 7, 1948 |
| 2,548,654 | Curd et al. | Apr. 10, 1951 |
| 2,597,025 | Orth | May 20, 1952 |
| 2,622,075 | Hemmi | Dec. 16, 1952 |
| 2,643,232 | Rose et al. | June 23, 1953 |
| 2,649,354 | Hemmi | Aug. 18, 1953 |
| 2,684,924 | Rose et al. | July 27, 1954 |